United States Patent [19]

Yockey

[11] Patent Number: 4,799,889
[45] Date of Patent: Jan. 24, 1989

[54] STUFFED BEAR AS TEACHING AID

[76] Inventor: Patricia Yockey, 8514 Shadowood Dr., Everett, Wash. 98208

[21] Appl. No.: 131,507

[22] Filed: Dec. 11, 1987

Related U.S. Application Data

[63] Continuation-in-part of Ser. No. 099,984, Sep. 23, 1987.

[51] Int. Cl.[4] .......................................... G09B 21/04
[52] U.S. Cl. ................................. 434/112; D21/159; 446/328
[58] Field of Search ............... 434/112; 446/327, 328, 446/369; D21/159

[56] References Cited

U.S. PATENT DOCUMENTS

| | | | |
|---|---|---|---|
| 3,820,276 | 6/1974 | Goldfarb et al. | 446/327 |
| 4,300,307 | 11/1981 | Biasuzzi et al. | 46/154 |
| 4,304,065 | 12/1981 | Baiera | 446/327 |
| 4,637,798 | 1/1987 | Maiden-Nerset | 446/369 X |
| 4,681,555 | 7/1987 | Natui | 446/327 |

FOREIGN PATENT DOCUMENTS 1515100  4/1978  United Kingdom ............... 446/327

OTHER PUBLICATIONS

"A Perky Puppet Family Helps Youngsters Learn to Accept Disabled Peers", Hodges, May 4, 1983 The Washington Post.

Primary Examiner—Ira S. Lazarus
Assistant Examiner—Peggy Neils
Attorney, Agent, or Firm—Milton S. Gerstein

[57] ABSTRACT

A stuffed bear for teaching sign language to deaf children. The stuffed bear has a pair of hollow tubular arms through which the arms of a teacher pass, so the hands project beyond the front edge surface of each arm. Each arm is secured by stitching to a side of the main body of the stuffed bear along one-quarter of the circumferential length of the rear edge surface of the arm, which length is the upper and forward section thereof, so that complete articulation of the arm may be acheived to allow for the signs of sign language to be performed.

7 Claims, 1 Drawing Sheet

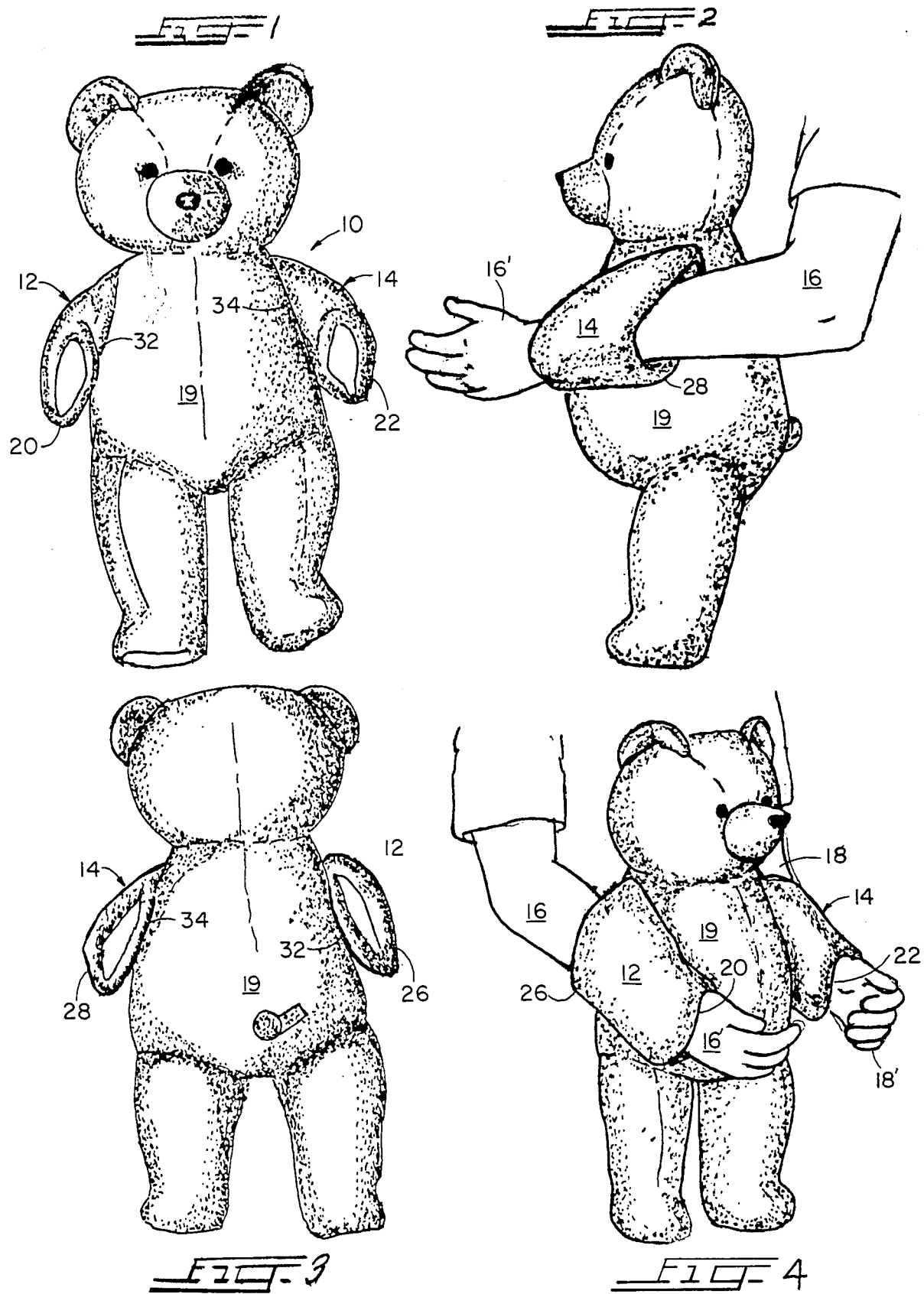

STUFFED BEAR AS TEACHING AID

CROSS REFERENCE TO RELATED APPLICATION

The present application is a continuation-in-part of application Ser. No. 99,994 filed on Sept. 23, 1987.

BACKGROUND OF THE INVENTION

The present invention is directed to a teaching aid for the deaf, and has as its main goal an aid in the teaching and usage of sign language. It has been found that people attempting to learn sign language and especially the deaf, emotionally, or learning-impaired and physically handicapped, learn better from a teacher or communicator when the teacher is camouflaged or hidden behind a teaching aid which allows for the teacher to carry on his or her lesson or objective while, at the same time presenting to the viewer a facade that is pleasing and unobtrusive to the viewer. It is, of course, well-known to teach children, to a certain and limited extent, via puppets, dolls, and the like, which allows one to engage the interest and fancy of the child while concomitantly instructing the child. Any barrier, whether natural or artificial, is at least partially broken down by such "transference" to the inanimate, yet "attention-directing", prop or aid. It has been found that in communicating through sign language that a uniquely-configured and structured, partially maneuverable stuffed bear has achieved success hitherto unrealized, which has broken down the barrier between teacher and student, and between professional and patient to teach sign language and to open communication. The prop, or aid, has opened communication to some individuals who previously were non-communicative.

The stuffed bear of the invention is not limited to the teaching of sign language, but has use in other areas of communicating. It has been found that the stuffed bear of the invention has been very useful in breaking down barriers between teacher and student by acting as a learning tool and as an extension of the teacher even at college level. It has been found that sexually abused and tactile-defensive children have had their inhibitions and barriers broken by the stuffed bear of the invention, since it offers no threat, thereby allowing for direct communication between child and parent or therapist via the bear. Even children of two years of age are assisted and listen to a parent via the stuffed bear of the invention, easing frustrations in communication at this difficult age. The stuffed bear of the invention has also been found to have great effectiveness when used by pediatricians in examining a child, by the doctor's insertion of his or her arms through the open tubular arms of the bear, thereby making it appear that the stuffed bear is the one who is actually examining or administering to the child, which, it has been found, has broken down inhibitions and fear normally associated with doctor visits.

The opportunity for learning through the imaginative play with puppets has been nearly inaccessible to the deaf. Puppets that "talk" can only be interpreted to the deaf. Through the stuffed bear of the invention, an animated object, namely the bear, can actually "talk" directly to the deaf audience or students. When students are allowed to communicate through the bear of the invention, they learn to express new ideas and feelings which might be unacceptable in the real world, yet very necessary for them to explore.

SUMMARY OF THE INVENTION

It is the main objective of the present invention to provide an animated object having a pair of front or upper tubular arms or appendages through which a person may insert his or her arms, in order to provide a transference from the person to the animated object, in order to serve as an aid in communicating through sign language, as well as to serve as a teaching aid in general for a plethora of different subjects.

It is an objective of the present invention to provide such an animated object that also has benefit for communicating with the emotionally-disturbed and learning-disabled, by allowing for the therapist or parent to guise himself or herself in a manner that engrosses the child with the animated object that causes inhibition-breakdown and transference to the animated object thereby assuaging fear and terror.

It is another objective of the present invention to allow for the front arms or appendages articulation in all directions so that the teacher, parent, physician, or other adult is free to use his or her arms and hands freely to perform the tasks, actions, movements, or the like, necessary to achieve the inhibition-breakdown add fear-assuagement desired.

It is another objective of the present invention to allow for the complete insertion of the arms of the person through the front paws of the stuffed animal of the invention such that the hands project outwardly beyond the remote front edge surfaces of the respective front paws, to allow for complete and maximum freedom to the maneuverability of the hands.

Toward these and other ends, the animated object or stuffed animal of the present invention is, in the preferred embodiment, a stuffed bear, the upper or front arms or paws of which are constructed as hollow tubes, with each tubular arm defining a hollow interior through which passes a respective arm of a person. The length of each tubular arm is such that any person's arms may extend therethrough with his or her hands exterior of the forward-most edge surface of the tubular arm, so that the hands are free for easy and complete manipulation, in order to perform the desired tasks thereof. Furthermore, in order to allow for the maximum amount of maneuverability and freedom of movement, each tubular arm is connected, or stitched, to the main body of the stuffed bear along only a fraction of the tubular circumference thereof. The stitched or connected portion of the rearward portion of the tubular arm thereby serves as a joint or pivot line about which the arm is articulated or rotated during the performance of the task required. In the preferred form of the invention, the rearward edge surface is peripherally stitched to the body portion for between ⅓ and ½ along the circumference thereof. The stitched rearward portion of the arm is preferably the front, upper circumferential portion thereof.

BRIEF DESCRIPTION OF THE DRAWING

The invention will be more readily understood with reference to the accompanying drawing, wherein:

FIG. 1 is a front view of the stuffed bear for teaching sign language according to the invention;

FIG. 2 is a side elevation view thereof:

FIG. 3 is a rear view thereof: and

FIG. 4 is an isometric view thereof.

DETAILED DESCRIPTION OF THE INVENTION

Referring now to the drawings in greater detail, the stuffed bear of the invention is indicated generally by reference numeral 10. The stuffed bear 10 is made preferably of fur-like acrylic with stuffing of Dacron II or similar polyester material. The bear is preferably 25 inches in height. The bear 10 is provided with a pair of upper arms 12, 14, each of which is a hollow tube. Each arm is preferably made of four layers, which is actually two circular layers of the fur-like acrylic. There is no stuffing in the arms of the bear, but it is a possible option. Each arm 12, 14 allows for the insertion therethrough of a person's arm 16, 18 as shown in FIGS. 2 and 4. The length of each tubular arm 12, 14 is such that the hands 16', 18' of each arm may readily and prominantly project outwardly beyond the forward or frontmost edge surface 20, 22 of the respective tubular arms 12, 14, so that each hand's fingers have complete freedom of movement in all directions.

Each arm 12, 14 is secured by stitching to the body portion 19 of the stuffed bear along only a circumferential edge surface portion of the rearward or back edge surface of the respective arm. In the preferred embodiment, an upper, front section of the rear edge surface 26, 28 is stitched to a respective side portion of the body 19 of the bear. This front section is indicated by reference numerals 32, 34, and constitutes between ⅛ and ⅓ of the total circumference of the rear or back edge surface of the respective arm, so that a maximum amount of freedom of maneuverability is provided to the arm inserted through the tubular arm, to allow for a degree of rotational movement to the arm necessary to allow the person to manipulate the arm to carry out a desired task during motions of sign language, or the like. In the preferred embodiment, this stitched or connected circumferential edge surface portion 32, 34 is ¼ of the total circumference of the respective rear edge surface 26, 28. Each stitched edge 32, 34 originates preferably at the upper portion of the respective rear edge surface 26, 28 and continues forwardly, toward the front edge surface 20, 22, and downwardly for approximately 90 degrees in the preferred form. Thus, the stitched or connected edge surface 32, 34 faces toward the front of the bear 10, and is visible from the front. Each stitched portion 32, 34 is curved, to enhance the natural look to the arm.

In using the stuffed bar 10, the person's arms are inserted through the hollow arms 12, 14, so that the hands project beyond the forward end of the respective arm. With the hands free, and the limited amount of arcuate stitching of the rear edge surface of each arm to the body of the bear allowing for articulated, rotational movement of the respective arm about the pivot line defined by the stithed connection, a teacher may teach sign language to the deaf or handicapped. This articulation of each arm occurs in a vertical plane parallel to the height of the bear, and also occurs in a plane perpendicular thereto, which allows the respective hand to contact various portions of the body and head of the bear for teaching sign language.

To aid in the teaching of sign language, as well as to further cause the lessening of inhibitions and the breaking down of fears of the child or student, each hand 16', 18' may be covered with a conventional tight-fitting glove, which is also preferably furry to better simulate and enhance the bear-like quality of the stuffed bear and the direction-transferring characteristic of the stuffed bear during teaching. The bear 10 may also be used by teachers of all subjects to pique interest and remove inhibitions. Furthermore, the articulate nature of the arms 12, 14 also allows the bear 10 to be used by pediatricians for examining children, which breaks down fears and inhibitions of the child, and helps to forge a tie between the physician and child.

While a specific embodiment of the invention has been shown and described, it is to be understood that numerous changes and modifications may be made without departing from the scope and spirit of the invention as set forth in the appended claims. While the invention has been disclosed as being embodied by a stuffed bear, it is to be understood that a stuffed dog, fish or or the like, or a vegetable, such as a carrot, or any animated creature and the like, may be used instead for the same results. Furthermore, any conventional stretch glove may be used, such as that manufactured by Begman, Inc. called "MAGIC GLOVE", where one size fits all.

What is claimed is:

1. A stuffed animated object for use in teaching sign language, and communicating through signs and gestures, comprising:

a main body portion comprising a first side section and a second side section;

a pair of arms projecting from said main body portion, each of said pair of arms comprising a hollow, tubular arm member having a rearward circumferential edge surface and a forward circumferential edge surface, whereby an arm of a person may be passed through each of said pair of arms; each said forward circumferential edge surface being free from further connection, the interior volume of each said tubular arm communicating with the ambient air at both said forward and rearward circumferential edge surfaces;

each of said pair of arms having a length as taken between said rearward and forward circumferential edge surfaces less than the length of an arm of an average adult so that the hand of the arm may project beyond said forward circumferential edge surface to allow free movement to the hand for teaching sign language, or the like;

the circumference at each said edge surface being large enough to allow for the passage of an adult's hand and arm;

said rearward circumferential edge surface of each said pair of arms being secured to a respective side section of said main body portion along a fraction of the circumferential length thereof, said fraction of length comprising an upper peripheral section thereof, said fraction being between ⅛ and ⅓ of the total length of said respective circumferential edge surface.

2. The stuffed animated object according to claim 1, wherein said stuffed object is a bear.

3. The animated object according to claim 1, wherein said fraction is ¼ of the total circumferential length of said respective rearward edge surface.

4. The animated object according to claim 1, wherein said stuffed object is a bear having a height of 28 inches.

5. The animated object according to claim 1, in combination with a pair of gloves, one for each hand projecting through a respective said arm.

6. The animated object according to claim 5, wherein said stuffed object is a stuffed bear having a height of 28 inches.

7. A method of teaching sign language to deaf children, in which a stuffed animated object having a pair of hollow arms is used, comprising:
 (a) inserting a person's arms through the pair of hollow arms of the stuffed animated object, said step comprising positioning the hands of the person's arms exterior of and projecting beyond the front edge surfaces of the pair of hollow arms of the stuffed animated object, so that each hand is exposed and visible and allowed free maneuverability;
 (b) articulating the person's arms while in the pair of hollow arms of the stuffed animated object in a vertical plane, in a horizontal plane, and in a plane at an angle relative to each of the vertical and horizontal planes;
 (c) said step (b) comprising forming signs of sign language for communicating with deaf persons and for teaching them sign language; and
 (d) said step (c) comprising forming signs of sign language by contacting various parts of the stuffed animated object representative of standard sign language words, said step (d) comprising touching parts of the head of the animated object.

* * * * *